United States Patent [19]
Leng et al.
[11] Patent Number: 4,568,817
[45] Date of Patent: Feb. 4, 1986

[54] THERMAL PRINTING METHOD AND APPARATUS

[75] Inventors: Svay Leng; Toshiharu Inui; Haruhiko Moriguchi, all of Ebina, Japan
[73] Assignee: Fuji Xerox Co. Ltd., Tokyo, Japan

[21] Appl. No.: 624,615
[22] Filed: Jun. 26, 1984
[30] Foreign Application Priority Data
Jun. 29, 1983 [JP] Japan ............................... 58-117245
[51] Int. Cl.[4] .............................................. G01D 15/10
[52] U.S. Cl. ................................ 219/216; 346/76 PH
[58] Field of Search ............ 219/216 PH; 346/76 PH; 400/120

[56] References Cited

U.S. PATENT DOCUMENTS

| | | | |
|---|---|---|---|
| 3,632,970 | 1/1972 | Walkow | 219/216 PH |
| 4,449,136 | 5/1984 | Moriguchi | 219/216 PH |
| 4,449,137 | 5/1984 | Inui | 219/216 PH |

FOREIGN PATENT DOCUMENTS

| | | | |
|---|---|---|---|
| 204443 | 11/1983 | German Democratic Rep. | 346/76 PH |
| 52-33544 | 3/1977 | Japan | 400/120 |
| 54-13345 | 1/1979 | Japan | 400/120 |
| 55-164177 | 12/1980 | Japan | 400/120 |
| 56-62172 | 5/1981 | Japan | 400/120 |
| 58-131080 | 8/1983 | Japan | 346/76 PH |

OTHER PUBLICATIONS

Cunningham, E. A., "Thermal Printhead Drive . . . ", IBM Tech. Disc. Bull., vol. 24, No. 1B, Jun. 1981, pp. 646–648.

*Primary Examiner*—C. L. Albritton
*Assistant Examiner*—Teresa Walberg
*Attorney, Agent, or Firm*—Handal & Morofsky

[57] ABSTRACT

In a thermal printing utilizing a heat sensitive printing paper or an ink donor film, sticking of a heat sensitive color developing layer on the printing paper or a substrate film of the ink donor film to a thermal head is prevented by supplying a predetermined amount of electric energy to heat generating elements of the thermal head during time intervals between successive printing heat generations in the heat generating elements. For this purpose, warming pulses generated from a warming pulse generating circuit are applied during the time intervals to the heat generating elements for warming the same.

6 Claims, 8 Drawing Figures

(A)

(B)

THERMAL PRINTING METHOD AND APPARATUS

BACKGROUND OF THE INVENTION

1. Field of the Invention

This invention relates to a thermal printing method and apparatus for effecting printing line by line by the use of a heat sensitive medium, such as heat sensitive printing paper or ink donor film, and more particularly to a method and apparatus for preventing sticks caused by cooling of the heat sensitive medium that occurs between successive printing of the lines.

2. Description of the Art

Thermal printing apparatus of a construction shown in FIG. 1 has been widely known. In this apparatus is provided a thermal head 1 comprising a number of heat generating elements. Upon application of image information for each scanning line to thermal head 1, the heat generating elements generate heat in accordance with the image information. Printing paper 2 having a heat sensitive color developing layer on one side thereof is pressed by a back roller 3 against thermal head 1 so that the heat sensitive layer is directly brought into contact with the heat generating elements of thermal head 1. In synchronism with the application of the image information to thermal head 1, the printing paper 2 is shifted in a direction (subscanning direction) perpendicular to the arranged direction (main scanning direction) of the heat generating elements, so that a desired printing is effected on the printing paper 2.

In this case, when a single heat generating element is considered, the element repeats generation of heat and cooling as shown in a temperature variation curve of FIG. 2(B) upon reception of a printing pulse voltage P1 as shown in FIG. 2(A). Whenever the temperature of the heat generating element exceeds a color developing temperature $t_a$ of the heat sensitive layer, printing of the information in a scanning line is carried out on the printing paper.

The heat sensitive color developing layer on the printing paper 2 is made of a pigment or a dye such as carbon black and a softening material such as wax having a melting point $t_b$ in a range of 60° to 80° C. Thus, when the printing pulse voltage P is applied to the heat generating element, the temperature of the element easily exceeds the melting point $t_b$ thus melting the layer temporarily.

However, during a time interval between two adjacent pulse voltages $P_1$, the heat generating element is cooled to a temperature lower than the solidifying point $t_c$, thus solidifying the melted layer causing the layer to stick to the contacting surface of the heat generating element. The stick of the solidified layer results in an increase of feeding load of the printing paper 2 and deterioration of the reproduced image.

Such a disadvantage not only occurs in the case of the above described direct type thermal printing apparatus, but also occurs in the case of a transfer type thermal printing apparatus. In this type of apparatus, an ink donor film 6 having a heat sensitive ink layer 5 formed on one side of a substrate film 4 as shown in FIG. 3, is used with a heat insensitive printing paper 7. Under the action of the back roller 3, the printing paper 7 is brought into contact with the heat sensitive ink layer 5 formed on the substrate film 4 which is fed in sliding contact with the thermal head 1 as shown in FIG. 4. When the temperature of the heat generating element in the thermal head 1 goes up in excess of a predetermined value under application of the printing pulse voltage P1 as described above, the ink in the heat sensitive ink layer 5 of the ink donor film 6 is transferred to the printing paper 7 for printing the image on the paper 7. However, since the substrate film 4 slidingly contacting the heat generating element is ordinarily made of a thermoplastic material, the substrate film 4 tends to be melted by the heat generated from the element. The melted film 4 is then solidified during the cooling period following the pulse voltage, the solidified film tending to stick to the surface of the thermal head 1, which not only increases the shifting load for the ink donor film 6, but also deteriorates the image quality. Such defects of the transfer type thermal printing apparatus can be easily understood by reading or interpreting the above described $t_a$, $t_b$ and $t_c$ to be the transferring temperature of the ink, the melting point of the substrate film 4, and a the solidifying temperature of the substrate film 4, respectively.

SUMMARY OF THE INVENTION

A principal object of the present invention is to provide a thermal printing method and apparatus wherein the possibility of the heat sensitive color developing layer of a heat sensitive printing paper or the substrate film of an ink donor film sticking to the thermal head can be substantially eliminated, and advantageous features such as reducing the shifting load and improving image quality can thereby be realized.

In order to achieve the above described object of the invention, there are provided a method and an apparatus of a direct thermal printing type, wherein there is available during the time interval between the successively applied image printing electric energies, electric energy sufficient for maintaining a heat generating element of the thermal head at a predetermined temperature that is higher than the solidifying temperature of the heat sensitive color developing layer of the recording paper, but is lower than the color developing temperature of the color developing layer, is applied to the heat generating element.

According to another feature of the present invention, there are provided a method and an apparatus of a transfer, thermal printing type, wherein there is available the time interval between the successive applications of the image printing electric energies, electric energy sufficient to maintain the heat generating element at a predetermined temperature that is higher than the solidifying temperature of the substrate film of the ink donor film, but is lower than the ink transfer temperature of the heat sensitive ink layer provided on the substrate film, is applied to the heat generating element.

According to the invention, since warming electric energy is applied to the heat generating elements of a thermal head as described above for maintaining the elements at a predetermined temperature, sticking of the color developing layer of the heat sensitive printing paper or the substrate film of the ink donor film to the thermal head can be prevented, and any increase in the shifting load of the printing paper or the ink donor film as well as the deterioration of image quality can be thereby eliminated.

BRIEF DESCRIPTION OF THE DRAWINGS

In the accompanying drawings

DESCRIPTION OF THE PREFERRED EMBODIMENTS

Figure 5:
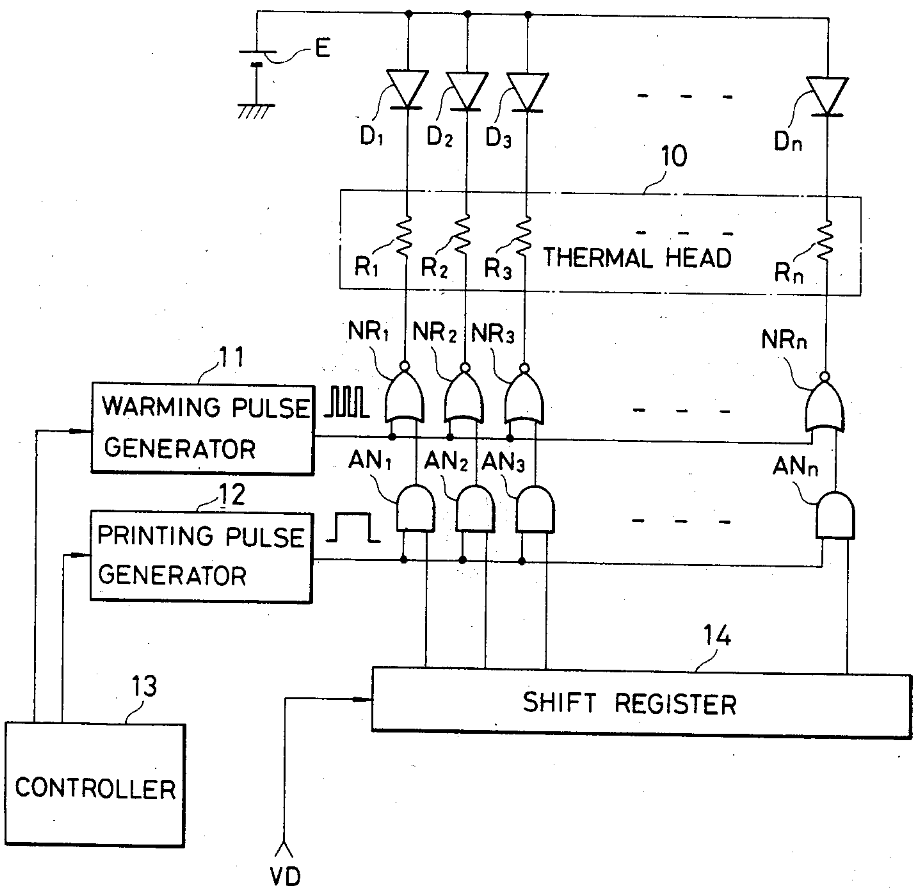
FIG. 5 is a diagram showing construction of a thermal printing apparatus constituting a preferred embodiment of the present invention.

FIG. 5 illustrates a thermal printing apparatus constituting a preferred embodiment of the present invention. In the drawing, $R_1$ through $R_n$ designate heat generating elements provided in a thermal head 10 (numbers of the heat generating elements required for printing image information on printing paper of, for instance, JIS Standard, Column A No. 4 and Column, B No. 4 sizes are 1,728 and 2.048, respectively). One of the ends of the heat generating elements $R_1$ through $R_n$ are connected through diodes $D_1$ through $D_n$ to one terminal of a power source E, while the other ends of the heat dendrating elements are connected to the outputs of NOR gates $NR_1$ through $NR_n$, respectively. On the other hand, one of the inputs of the NOR gates $NR_1$ through $NR_n$ are connected with the output of a warming pulse generator 11, while the other inputs of the NOR gates are connected with the outputs of AND gates $AN_1$ through $AN_n$, respectively. One of the inputs of the AND gates $AN_1$ through $AN_n$ are connected to the output of an image pulse generating circuit 12, and the other inputs of the AND gates $AN_1$ through $AN_n$ are connected with the parallel outputs of a series input parallel output shift register 14. Image data for each line to be printed on the printing paper is serially received in the shift register 14. Upon reception of all the data required for printing one line, the data corresponding to image elements to be printed in one line are stored in the respective stages of the shift register 14 in logic levels of "1" and "0". The image data stored in the shift register 14 is delivered in parallel to be applied to one inputs inputs of the AND gates $AN_1$ through $AN_n$.

Under the control of a controller 13 the printing pulse generating circuit 12 generates printing pulses of a predetermined pulse width at the timing corresponding to the printing operations for the successive lines. The printing pulses delivered from the printing pulse generating circuit 12 are applied to the other inputs of the AND gates $AN_1$ through $AN_n$. Thus the AND condition of the AND gates holds in response to the parallel outputs of the shift register 14 at the timing of the generation of the printing pulses from the printing pulse generating circuit 12. The outputs of NOR gates corresponding to the AND gates where the AND condition holds as described above are thus brought into low level, thereby causing electric currents to flow from the power source E through the corresponding diodes to the heat generating elements causing the elements to generate heat. For instance in FIG. 5, assuming that the AND condition holds in an AND gate $AN_3$ at the timing of generating printing pulses in the printing pulse generating circuit 12, the output of the AND gate $AN_3$ becomes high level, causing the output of the corresponding NOR gate $NR_3$ to become low level, thus allowing an electric current to flow from the power source E to the heat generating element $R_3$ for generating heat in the element $R_3$.

The warming pulse generating circuit 11 is controlled by the controller 13 so as to generate warming pulses of a predetermined duty ratio and a predetermined frequency. The warming pulses are applied to the other inputs of the NOR gates $NR_1$ through $NR_n$, respectively. More specifically, the controller 13 issues a command to the warming pulse generating circuit 11 for generating warming pulses during time intervals between the successive printing pulses generated from the printing pulse generating circuit 12 for printing successive lines. As a consequence, the warming pulse generating circuit 11 applies warming pulses of the predetermined duty ratio and frequency to the NOR gates $NR_1$ through $NR_n$. In response to the warming pulses, the outputs of the NOR gates $NR_1$ through $NR_n$ are brought into low level, causing warming electric currents to flow from the power source E to the heat generating elements $R_1$ through $R_n$. In this case, the amount of heat generated from each heat generating element is determined by the average voltage of the warming pulses, and hence by the duty ratio and frequency of the warming pulses. In the case of the direct printing type apparatus, the duty ratio and the frequency of the warming pulses are so selected that the heat generating elements are thereby maintained at a temperature higher than the solidifying temperature of the heat sensitive color developing layer provided on the heat sensitive printing paper, but lower than the color developing temperature of the same layer. On the other hand, in the case of the transfer type thermal printing apparatus, the duty ratio and the frequency of the warming pulses are so selected that the heat generating elements are maintained at a temperature higher than the solidifying temperature of the substrate film of the ink donor film, but lower than the transfer temperature of ink from the heat sensitive ink layer to the printing paper.

Figure 1:
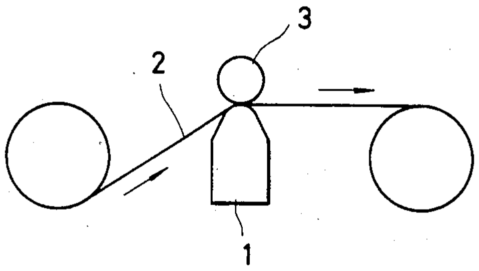
FIG. 1 is an explanatory diagram of a conventional direct type thermal printing apparatus.
Figure 2:
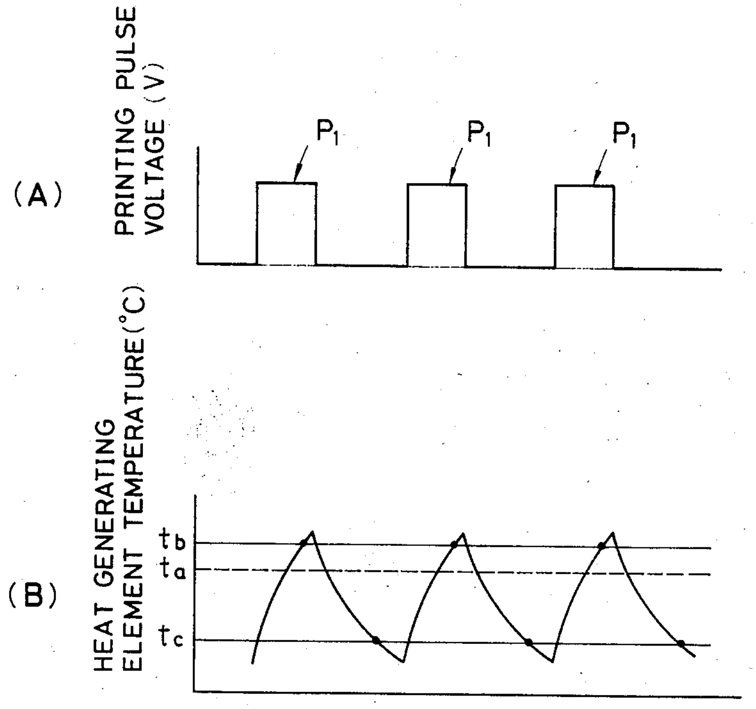
FIGS. 2(A) and 2(B) are waveform diagrams for explaining the operation of the apparatus shown in FIG. 1.
Figure 3:
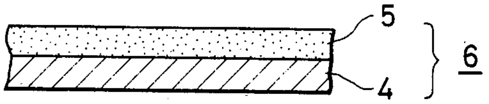
FIG. 3 is a fragmentary sectional view of an ink donor film to be used in a transfer type thermal printing apparatus.
Figure 4:
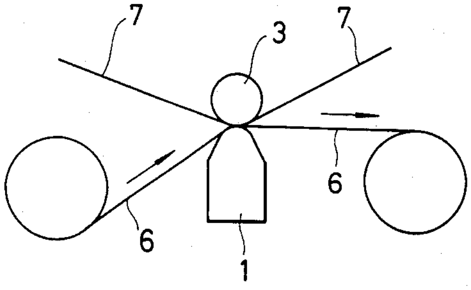
FIG. 4 is an explanatory diagram for the transfer type thermal printing apparatus.
Figure 6:
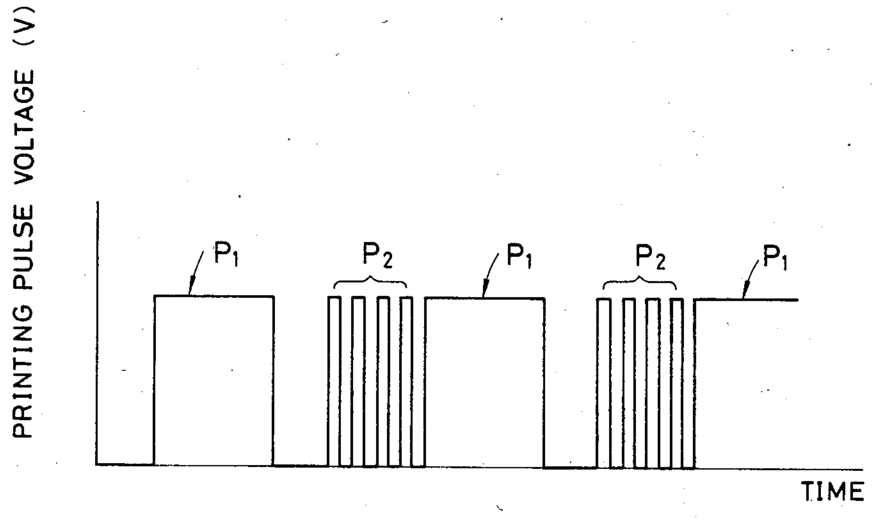
FIGS. 6(A) and 6(B) are diagrams for explaining the operation of the thermal printing apparatus shown in FIG. 5.
Figure 6:
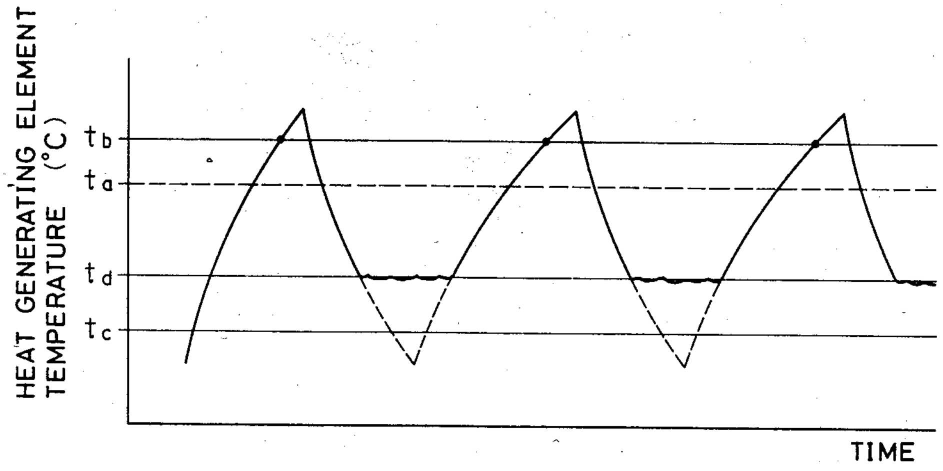

FIGS. 6(A) and 6(B) are diagrams showing the operation of the embodiment in comparison with that shown in FIGS. 2(A) and 2(B). FIG. 6(A) illustrates a waveform of voltage pulses applied to the heat generating elements, while FIG. 6(B) illustrates a temperature variation curve of the heat generating elements. As is apparent from FIG. 6(A), a plurality of voltage pulses $P_2$ having an extremely narrow width are interposed between two adjacent printing voltage pulses $P_1$ applied to the heat generating elements. By the application of the warming pulses $P_2$, in the case of the direct printing type apparatus, the heat generating elements are maintained at a temperature substantially equal to $t_d$ higher than the solidifying temperature $t_c$ of the heat sensitive color developing layer provided on the printing paper 2, but lower than the color developing temperature $t_a$ of the same layer. On the other hand, in the case of the transfer type printing apparatus, under application of the warming pulses $P_2$, the heat generating elements are maintained at a temperature substantially equal to $t_d$ that is higher than the solidifying temperature $t_c$ of the substrate film 4 of the ink donor film 6, but is lower than the transfer temperature $t_a$ of ink from the heat sensitive ink layer 5 to the recording paper 7.

Although the above described embodiment has been composed such that the electric energy applied to the heat generating elements $R_1$ through $R_n$ of the thermal head for effecting printing is controlled by controlling the pulse width of the printing pulses applied to the AND gates $AN_1$ through $AN_n$, while the electric energy applied to the heat generating elements $R_1$ through $R_n$ of the thermal head for warming the same is controlled by controlling the duty ratio and the frequency, it is apparent that the invention is not necessarily limited to such an arrangement, but various modifications may otherwise be carried out without departing the scope of the present invention, and the characteristic feature of the present invention resides in that a predetermined amount of electric energy is applied to each of the heat generating elements during time intervals between the successive heat generations of the heat generating elements for the purpose of printing, so that the heat generating element is warmed to a temperature higher than the solidifying temperature of the color developing layer of the heat sensitive printing paper or the solidifying temperature of the substrate film of the ink donor film.

We claim:

1. A thermal printing method for printing desired image information on a heat sensitive printing paper of a type which has a heat sensitive color developing layer with a color developing temperature and a solidfying temperature, comprising the steps of holding the printing paper in sliding contact with a thermal head of a type which has a plurality of heat generating elements, applying at the same time as said holding a printing electric energy in a first pulse form comprising first pulses, to said heat generating elements for generating intermittent heat pulses in said elements; and applying warming electric energy in a second pulse form comprising second pulses to said heat generating elements for maintaining said elements at a temperature higher than the solidifying temperature of said color developing layer, but lower than the color developing temperature of said heat sensitive color developing layer, said second pulse form having pulses with a duration less than the durations of pulses in said first pulse form, at least a plurality of said second pulses being applied during every time period between adjacent pulses of said first pulses.

2. The thermal printing method set forth in claim 1 wherein said warming electric energy is applied to said heat generating elements in the form of repetitive second voltage pulses having a predetermined pulse width which is substantially shorter than the width of said first pulses, the repetition rate of said second pulses being greater than the repetition rate associated with said first pulses, an amount of heat thereby generated in said heat generating elements being controlled by the duty cycle of said voltage pulses.

3. A thermal printing method for printing desired image information on a heat insensitive printing paper, comprising the steps of overlaying the paper with an ink donor film of a type which comprises a substrate film and a heat sensitive ink layer provided on a surface of the substrate film said ink donor film having a solidifying temperature and an ink transfer temperature, and while the paper and the ink donor film are held in sliding contact with a thermal head of a type which includes a plurality of heat generating elements applying a printing electric energy in a first pulse form, comprising first pulses, to said heat generating elements for generating heat intermittently in said heat generating elements; and applying a warming electric energy in a second pulse form comprising second pulses during all time intervals between the applications of said printing electric energy, to said heat generating elements for maintaining said elements at a temperature higher than said solidifying temperature of said substrate film of said ink donor film, but lower than said transfer temperature at which the ink in said heat sensitive ink layer of said ink donor film is transferred to said printing paper.

4. The thermal printing method set forth in claim 3 wherein said printing electric energy is applied to said heat generating elements in the form of voltage pulses having a predetermined pulse width.

5. The thermal printing method set forth in claim 3 wherein said warming electric energy is applied to said heat generating elements in the form of repetitive second voltage pulses having a predetermined pulse width, which is substantially shorter than the width of said first pulses, the repetition rate of said second pulses being greater than the repetition rate associated with said first pulses, the amount of heat thereby generated in said heat generating elements being controlled by the duty cycle of said voltage pulses.

6. A thermal printing apparatus comprising:

a thermal head including a plurality of heat generating elements;

printing pulse generating means for applying printing electric energy in the form of a first series of pulses having a first duration corresponding to image information to be printed on said heat generating elements of said thermal head;

warming pulse generating means for applying warming electric energy in the form of a second series of pulses having a second duration, said second duration being less than said first duration to said heat generating elements for maintaining said elements at a temperature not sufficient for printing of image information, but sufficient for preventing solidification of a heat sensitive printing medium; and control means for controlling said warming pulse generating means so as to generate a plurality of warming pulses during the intervals of time defined between all pulses of said adjacent printing pulses generated from said printing pulse generating means.

* * * * *